(12) United States Patent
Kacines

(10) Patent No.: US 10,736,273 B1
(45) Date of Patent: Aug. 11, 2020

(54) MAGNETIC WREATH HANGER

(71) Applicant: Jeffery J. Kacines, Allen, TX (US)

(72) Inventor: Jeffery J. Kacines, Allen, TX (US)

( * ) Notice: Subject to any disclaimer, the term of this patent is extended or adjusted under 35 U.S.C. 154(b) by 0 days.

(21) Appl. No.: 16/034,063

(22) Filed: Jul. 12, 2018

(51) Int. Cl.
*A01G 5/04* (2006.01)
*F16B 1/00* (2006.01)
*F16M 13/02* (2006.01)

(52) U.S. Cl.
CPC ............. *A01G 5/04* (2013.01); *F16B 1/00* (2013.01); *F16M 13/022* (2013.01); *F16B 2001/0035* (2013.01)

(58) Field of Classification Search
CPC ......... A01G 5/04; F16M 13/022; F16B 1/00; F16B 2001/0035
USPC ............ 248/206.5, 301, 304, 305, 27.8, 300
See application file for complete search history.

(56) References Cited

U.S. PATENT DOCUMENTS

| | | | | |
|---|---|---|---|---|
| D289,255 S  * | 4/1987 | Chasen | ........................... | D6/323 |
| 5,104,077 A * | 4/1992 | Liu | ........................ | F16B 47/00 |
| | | | | 248/205.8 |
| 5,110,077 A * | 5/1992 | Mossini | .................... | A47G 1/17 |
| | | | | 248/205.3 |
| D377,599 S * | 1/1997 | Hofman | ......................... | D8/372 |
| 6,491,271 B1 * | 12/2002 | Adams | ...................... | A47G 1/17 |
| | | | | 248/206.5 |
| 6,729,591 B2 * | 5/2004 | Hsu | ........................... | G09F 1/10 |
| | | | | 248/205.6 |
| 7,887,017 B2 | 2/2011 | Moran | | |
| 8,181,924 B2 | 5/2012 | Pepe | | |
| 8,739,453 B1 * | 6/2014 | Conner | .................... | F41A 23/18 |
| | | | | 248/206.5 |
| 9,010,702 B2 | 4/2015 | Pepe | | |
| 9,581,292 B2 | 2/2017 | Kremer et al. | | |
| 9,642,480 B1 | 5/2017 | Tanger et al. | | |
| 2002/0088909 A1 | 7/2002 | Chen | | |
| 2007/0120392 A1 * | 5/2007 | Wolfinger | ............... | F16B 45/00 |
| | | | | 296/100.17 |
| 2009/0272862 A1 * | 11/2009 | Pinchuk | ................... | A47G 1/20 |
| | | | | 248/206.5 |
| 2011/0140474 A1 | 6/2011 | Smith et al. | | |
| 2012/0308763 A1 * | 12/2012 | Chen | ........................ | B32B 3/06 |
| | | | | 428/78 |
| 2013/0149504 A1 | 6/2013 | Reingewirtz | | |
| 2014/0061409 A1 | 3/2014 | Mayhew, Jr. | | |

(Continued)

*Primary Examiner* — Muhammad Ijaz
(74) *Attorney, Agent, or Firm* — Roger N. Chauza, PC

(57) ABSTRACT

A magnetic hanger attachable to a magnet attracting surface for hanging an item therefrom. The magnetic hanger includes a frame to which one or more magnets are attached. The frame includes a hook for hanging the item therefrom. A back of the magnetic hanger is magnetically attracted to the magnet attracting surface. The peripheral edge of the hanger includes a rim formed around the frame. The rim is spaced from the back of the frame so that when the magnetic hanger is being attached to the magnet attracting surface, there is a space around the rim to partially insert the user's finger tips so that they are not pinched when the magnet(s) are pulled toward the magnet attracting surface. The spaced rim also facilitates the removal of the magnetic hanger from the magnet attracting surface. The frame can be formed with a channel therearound to provide strength so that the frame does not flex during removal of the magnetic hanger from the magnet attracting surface.

20 Claims, 7 Drawing Sheets

(56) References Cited

U.S. PATENT DOCUMENTS

| | | | |
|---|---|---|---|
| 2015/0144753 A1* | 5/2015 | Severson | A44C 15/003 |
| | | | 248/206.5 |
| 2016/0047494 A1 | 2/2016 | Dickinson et al. | |
| 2016/0068117 A1 | 3/2016 | Huelke et al. | |
| 2016/0102809 A1* | 4/2016 | Kikuchi | F16B 45/00 |
| | | | 248/206.5 |
| 2016/0178340 A1 | 6/2016 | Chu et al. | |
| 2016/0215925 A1 | 7/2016 | Reingewirtz | |

* cited by examiner

MAGNETIC WREATH HANGER

TECHNICAL FIELD OF THE INVENTION

The present invention relates in general to hangers, and more particularly to methods and apparatus for hanging ornaments, heavy objects, and the like.

BACKGROUND OF THE INVENTION

Various hangers have been devised over time to organize items and otherwise display items so that they are easier to see and to make such items readily available. Traditionally, items have been hung from different types of hangers so that they can be removably attached to a wall or the like. Peg boards and metallic hangers are examples. Other hangers are constructed of a threaded end and are simply threaded into a board or other similar material. While these hangers worked for their intended purpose, they had their disadvantages. For example, the spacing and location of the hangers were not easily changed.

The foregoing problems were by and large overcome by using magnetic hangers. This type of hanger can be placed at any location on the metallic frame structure. However, the magnetic hangers required some type of metallic structure to attract the magnetic part of the hanger. In order to hang items that are heavy, it is expedient to use either a magnet that is physically larger or a magnet constructed of a stronger magnetic material. It is well known that the stronger the magnet, the more difficult it is to remove from the metallic structure. Conversely, when using stronger magnets with hangers, heavier items can be hung therefrom. Another problem with the use of strong magnets is when they are attached to the metallic structure, the fingers of the installer can often be pinched between the magnet and the metallic structure. This can lead to minor injuries and painful situations. A further problem with the use of strong magnets for items, when the items are shipped together, it can be difficult to separate one magnetic item from the other magnetic item.

The prior art is replete with magnetic hangers of all types. Many have a round base that houses a round magnet. From the base is formed a hook extending perpendicular to the base to hang items therefrom. Since such hangers are of conventional construction, there is a likelihood that the user's fingers can be pinched when applying the magnetic hanger to a metallic structure. Also when the hook extends outwardly from the hanger, it is more likely that if heavy objects are hung therefrom, the weight of the item acts like a lever to pull the magnet away from the metallic structure.

It can be seen that a need exists for a magnetic hanger that is specially designed to minimize the instances when the user's fingers can be pinched between the magnet/base and the metallic structure. A further need exists for a magnetic hanger that is sturdy and has a large magnetic force to hang heavy items therefrom. Yet another need exists for a magnetic hanger in which the hook is attached to the bottom of the base or frame, thus allowing heavy items to be hung therefrom.

SUMMARY OF THE INVENTION

In accordance with the principles and concepts of the invention, disclosed is a magnetic hanger that provides a peripheral edge spaced from the back planar side of the hanger to allow installation on a metallic surface without pinching the user's fingers. The space between the peripheral edge of the magnetic hanger and the metallic surface can also be used to easily pull the hanger from its magnetic attraction to the metallic surface. This is especially helpful when a strong magnet is used with the hanger to suspend heavy objects.

According to another feature of the invention, the magnetic hanger is constructed with a metal frame having a circumferential rim that is spaced from the back side of the hanger. The rim extends radially outwardly from the frame and is generally parallel to the metallic surface to which the metallic hanger is attached. This arrangement provides a space around the magnetic hanger and behind the rim to allow the user to install it on the metallic surface without pinching the user's fingers.

With regard to another feature of the invention, the magnetic hanger is constructed with a frame stamped from sheet metal. The frame includes a peripheral rim that has an extension that is formed into a hook to suspend items therefrom. A peripheral channel is formed in the frame that is generally parallel to the rim and provides support as well as a back surface that may engage the metallic surface. The inner peripheral sidewall of the channel forms a well in which the magnet(s) are attached.

A gasket can be bonded to a back side of the rim to provide somewhat of a cushion for the user's fingers when installing or removing the magnetic hanger from the metallic surface. The back surface of the magnetic hanger can also be equipped with a pad that engages the metallic surface. The pad can be formed of a friction material to prevent the magnetic hanger from sliding down the metallic surface when a heavy item is suspended therefrom. The pad can also be decorative to hide the magnet(s).

According to an embodiment of the invention, disclosed is a magnetic hanger that includes s frame member, where the frame member has a hook for hanging an item thereon. The frame of the magnetic hanger further includes at least one magnet attached thereto, and the magnetic hanger includes a back for magnetically engaging with a metallic surface. The frame member has a rim located around at least a part of a periphery of the frame, and the rim is spaced from the metallic surface when the magnetic hanger is magnetically engaged with the metallic surface. The space between the rim and the metallic surface is sufficient so that at least a portion of a person's fingers can be inserted therein without pinching the user's finger tips when installing the magnetic hanger.

According to a further embodiment of the invention, disclosed is a magnetic hanger for suspending an item from a metallic surface. The magnetic hanger includes a frame member having a rim located around a periphery thereof, where the rim extends radially outwardly and generally parallel to the metallic surface to which the magnetic hanger is magnetically attached. The frame member includes a channel that has first and second sidewalls that are spaced apart, and the first and second sidewalls are connected together with a back part that is adjacent the metallic surface. The first sidewall of the channel is connected to the rim, and the second sidewall of the channel forms a well of the frame member, where the well has a floor that is generally parallel to the metallic surface. The channel extends backwardly toward the metallic surface to thereby provide at least in part a space between the rim and the metallic surface, where the space is sufficient to allow at least a portion of a person's fingers to move the magnetic hanger into magnetic attachment with the metallic surface without the user's fingers being pinched. At least one magnet is attached to the floor of the well of the frame member. The rim of the frame includes an elongate extension which is bent toward a frontal portion of the magnetic hanger to form a hook to which the item can be suspended.

With regard to a further embodiment of the invention, disclosed is a method of fabricating a magnetic hanger. The method includes forming a frame member from flat sheet metal stock by stamping a continuous peripheral channel therein, and cutting the sheet metal stock to form a circumferential edge substantially around the peripheral channel except for a short length so that a rim of flat sheet metal is located between the peripheral channel and the circumferential edge. In the short length, cutting an elongate section that extends from the rim for forming a hook of the magnetic hanger. The method further includes bending the elongate section to form the hook. A flat portion of the sheet metal located radially inwardly from the peripheral channel defines a central well of the frame member, and at least one magnet is bonded to the central portion of the frame member.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
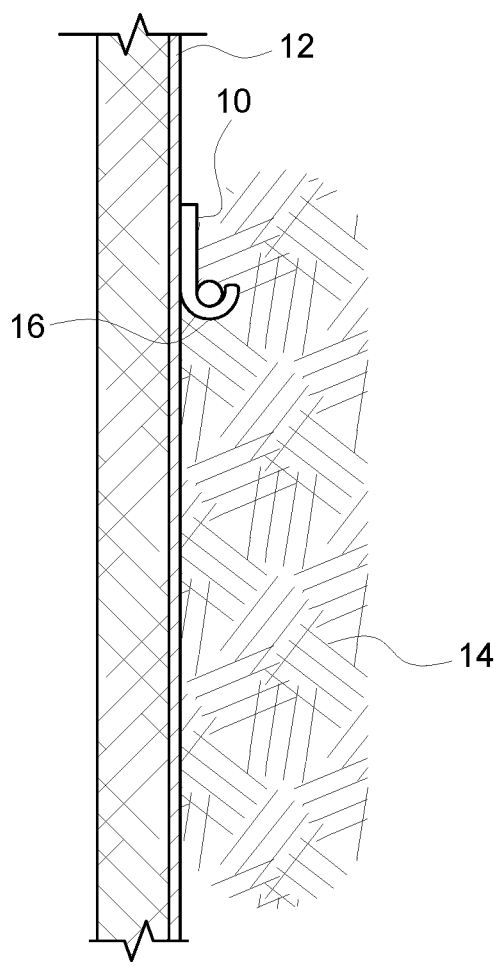
FIG. 1 is a side view of the hanger as attached to a metal door structure and from which a wreath is hung.

FIG. 1 of the drawings illustrates a magnetic hanger 10 attached (magnetically) to either a metallic door or a metal-clad door 12. The metal material is necessary in order for a magnet to be attracted thereto so as to be effectively removably attached thereto. As an alternative, the magnetic hanger 10 can be used with a metal plate (not shown) that is attached to a door constructed of either wood or a synthetic material. The metal plate can be screwed to the wood door in order to provide a metallic base to which the magnetic hanger 10 is attracted. The metal plate can be engraved with name of the owner of the premises, and constructed of a coated steel. As is well known, the metal base to which the magnet hanger 10 is attached can be any ferrous metal, such as alloy steel, carbon steel, some stainless steel metals, and other suitable materials. As noted below, the magnetic attraction of two magnets can be utilized to fasten a pair of magnetic hangers to opposite sides of a plate of glass, or to the surface of a plate of other non-metallic materials. The various materials to which a magnet can be attracted are known herein as magnet attracting surfaces. As used herein, the back of the magnetic hanger 10 is that part that engages the metallic door 12, and the frontal part of the hanger 10 is that part that faces away from the door 12.

A typical application of the magnetic hanger 10 of the invention is to hang items therefrom, such as ornaments. Illustrated in FIG. 1 is a wreath 14 having a circular wire frame (not shown) supporting the evergreen twigs. The wire frame is suspended from the hook 16 of the magnetic hanger 10. Wreaths 14 can include balls, pine cones, lights, and a bow as part of the decorations of the wreath 14. As will be described below, wreaths 14 can be heavy and thus the hanger 10 requires a strong magnetic attraction to the metal door 12 so that the wreath 14 does not move as a result of wind, slamming of the door 12, etc. As noted herein, when the magnetic attraction to the metal base is strong, there is a chance that the fingers of the person installing the magnet hanger 10 can be pinched. The magnetic hanger 10 is useful during various holidays to hang appropriate decorations therefrom. Examples of holidays in which ornaments may be hung from the door 12 include the Fourth of July, Halloween, Thanksgiving and Christmas, and others. Once the holiday is past, then the magnetic hanger 10 can be removed from the door without any evidence of the existence of a hanger.

Figure 2:
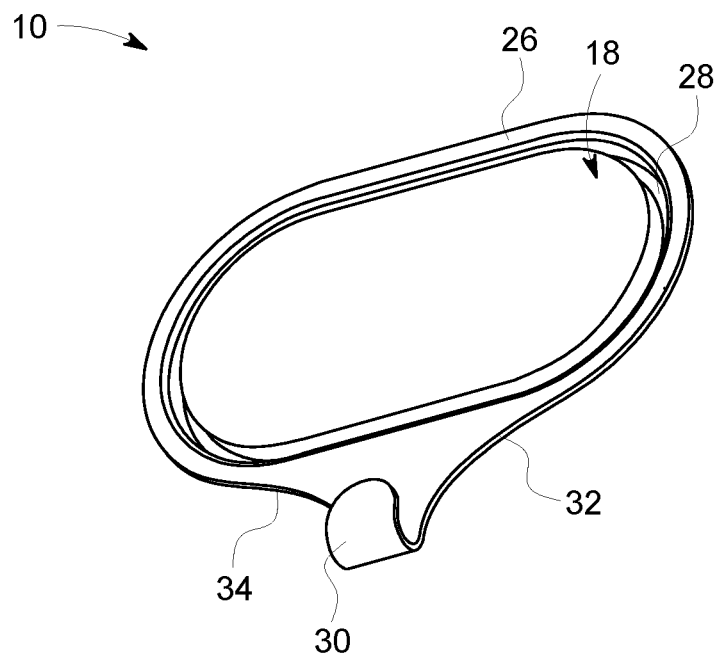
FIG. 2 is an isometric frontal view of the magnetic hanger constructed according to an embodiment of the invention.
Figure 3:
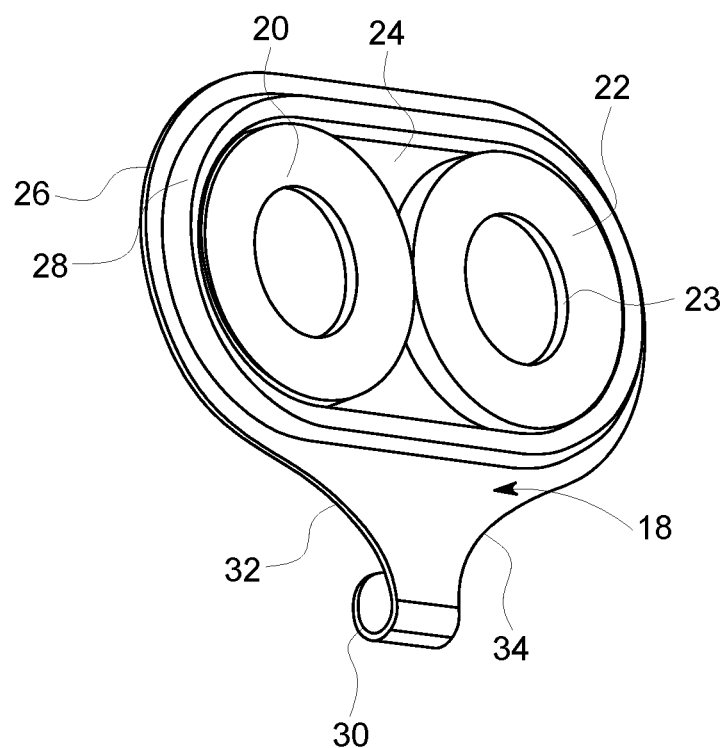
FIG. 3 is an isometric back view of the magnetic hanger of FIG. 1, with the backing pad removed.

FIGS. 2 and 3 illustrate the features of the front and back of the magnetic hanger 10 according to the invention. In the illustrated embodiment, the magnetic hanger 10 includes a metal frame member 18 to which a pair of round magnets 20 and 22 are bonded. In FIG. 3, the backing pad is removed to expose the two magnets 20 and 22. The frame 18 is constructed with a heavy gauge sheet steel material (1.2 mm thick), although other materials can be used, including non-magnetic metals, synthetic materials and plastics. While the frame 18 of the magnetic hanger 10 can be fabricated with many methods, the metal frame 18 is preferably fabricated by conventional stamping techniques. According to this fabrication technique, a roll or coil of sheet steel is used as the starter material and fed to a stamping press or machine. The frame 18 can be stamped or formed in the oval shape at one station, and then shaped in a subsequent station of the fabrication press. During the shaping step, the channel 28 is formed, and in the same or subsequent step the hook 30 can be formed. Compound dies or combination dies can be used in either progressive die machines or transfer machines. Stamping presses are conventional and used to fabricate many shaped metal parts. If a plastic material is employed as the frame 18, injection molding techniques can be used.

Once the frame 18 of the magnetic hanger 10 has been fabricated, one or two magnets 20 and 22 are bonded or otherwise fixed to the metal frame 18. In the preferred embodiment, the magnets 20 and 22 are of the ferrite type, it being realized that many other magnetic materials, including neodymium, can be employed. Neodymium magnets are well known for providing an unusually large magnetic force for allowing heavy objects to be suspended from the hanger. Each magnet 20 and 22 is about 7 mm thick and about 60 mm in diameter. The magnets 20 and 22 can be formed with a central hole 23 of a diameter of about 25 mm. The magnets 20 and 22 of the magnetic hanger 10 of FIG. 3 are typically covered with a cushion pad 80, illustrated in FIGS. 5 and 13. Those skilled in the art may choose to employ a single magnet instead of two magnets, and in shapes other than illustrated. The magnets 20 and 22 are bonded in the recessed well 24 (FIG. 3) of the frame 18 formed by the inner sidewall of the channel 28. A conventional adhesive bonding agent is employed to fasten the magnets 20 and 22 to the frame 18. Other suitable bonding agents and double-sided tapes can be utilized with equal effectiveness.

Figure 4:
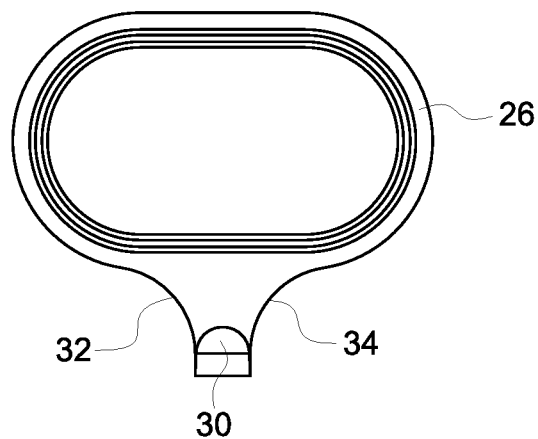
FIG. 4 is a frontal view of the magnetic hanger of FIG. 2.
Figure 5:
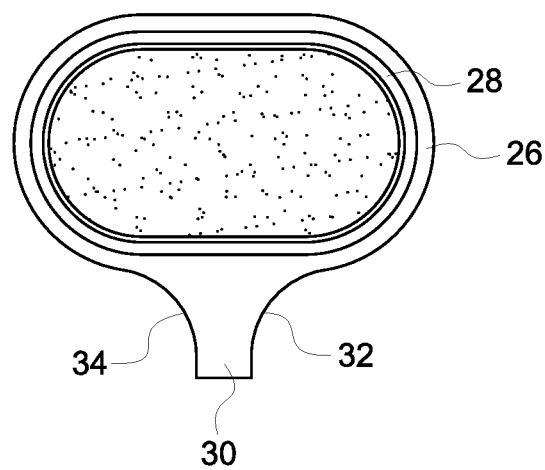
FIG. 5 is a back view of the magnetic hanger of FIG. 3.
Figure 6:
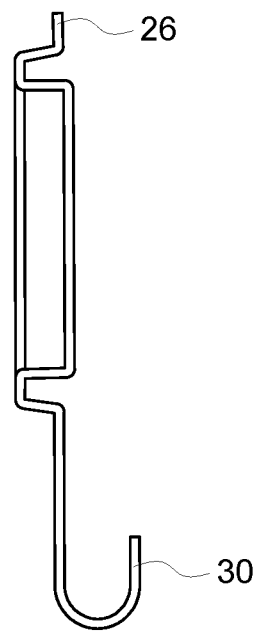
FIG. 6 is a side view of the magnetic hanger of FIG. 4, the opposite side of the magnetic hanger being a mirror image.
Figure 7A:
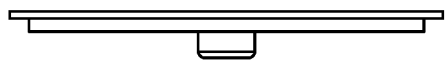
FIG. 7a is a top view of the magnetic hanger of FIG. 4.
Figure 7B:
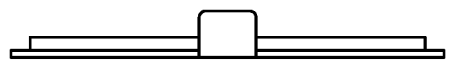
FIG. 7b is a bottom view of the magnetic hanger of FIG. 5, where the lead lines and reference numerals of FIGS. 4-6 and 7a and 7b do not form a part of the invention.
Figure 8:
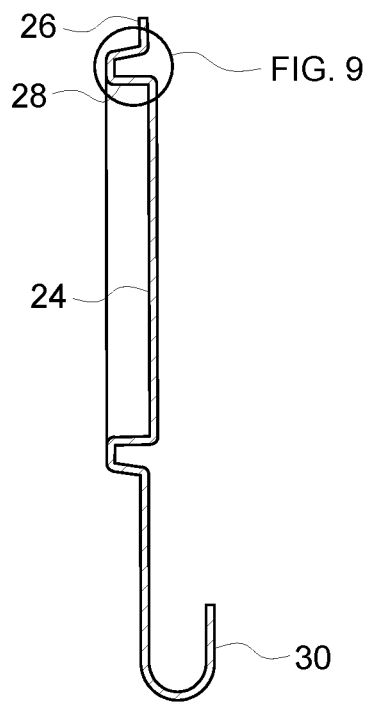
FIG. 8 is a top-to-bottom cross-sectional view through the middle of the magnetic hanger of FIG. 4.
Figure 9:
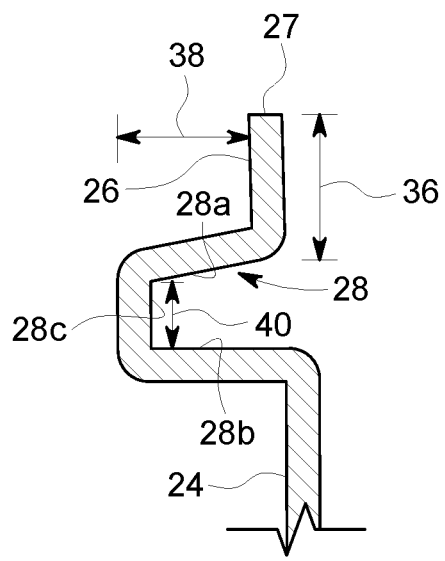
FIG. 9 is an enlarged view of the circled portion of the magnetic hanger of FIG. 8.

The features of the frame 18 of the magnetic hanger 10 will now be described. The cross-sectional views of FIGS. 8 and 9 illustrate the peripheral rim 26 of the magnetic hanger 10. Formed as part of the frame 18 of the magnetic hanger 10 is a peripheral channel 28 with sidewalls 28a and 28b that extend generally parallel to the outer edge 27 (FIG. 9) of the rim 26. The circumference of the outer edge 27 is generally oval in the preferred embodiment. The frame 18 is formed so that the rim 26 extends inwardly from the edge 27, and then inwardly (FIG. 8) into the channel 28, downwardly with the general width of the connecting channel wall 28c, and then outwardly to the central well 24 of the frame 18. The central well 24 is formed by the channel wall 28b. As noted above, the magnets 20 and 22 are located in the recessed central well 24 of the frame 18. The shape of the frame 18 then extends to the opposite edge thereof with the same shaped features as described above. The general shape of the frame 18 is the same at any diametric location, except with regard to the hanger hook 30. Here, a portion of the sheet metal rim 26 extends radially outwardly and then is gently curved back toward the rim 26 of the frame to form the hook 30. The hook 30 extends to the rim 26 with gently curved corners 32 and 34 (FIGS. 4 and 5). The gently curved corners 32 and 34 provide strength to the hook 30 when the hook 30 is used to lift the magnetic hanger 10 and remove it from the metal portion of the door 12. As can be seen, the hook 30 is an extension of the rim 26 and is located under the magnetic hanger 10 so that the weight of the item together with the hook 30 does not function as a lever to pull the top portion of the magnetic hanger 10 away from the metallic surface 12.

According to a feature of the invention, the magnetic hanger 10 is fabricated with the peripheral rim 26 spaced from the surface of the door 12. This allows a user to apply the magnetic hanger 10 to the metal surface without pinching the fingers. Further, this spacing between the door 12 and the peripheral rim 26 allows the user to place at least a portion of his/her fingers in such space to facilitate removal of the magnetic hanger 10 from the door 12. As an alternative, the hook 30 is constructed so that it can also be grasped to facilitate either installing or removing the magnetic hanger from a metal surface. The hook 30 is spaced from the edge of the frame 18 of the magnetic hanger 10 so that additional leverage is available to pry the magnet(s) away from the metal surface. The peripheral rim 26 can be used in conjunction with the hook 30 to install or remove the magnetic hanger 10 from its attachment to a surface.

In order to understand this feature, reference is made again to FIG. 9, where there is illustrated an enlargement of the rim 26 and the channel 28 of the magnetic hanger 10. Here, the rim 26 extends radially outwardly from the outer sidewall 28a of the channel 28 a suitable distance 36, and preferably about 6.0 mm. The back surface of the rim 26 is spaced from the back surface of the connecting channel wall 28c a suitable distance 38, and preferably about 6.0 mm. The width 40 of the channel 28 at the frontal surface of the connecting wall 28c is about 3.0 mm.

It can be seen that the space or volume in which the user's finger tips can be inserted behind the rim 26 is sufficient to allow the magnetic hanger 10 to be fully engaged with the metallic surface of the door 12 without pinching the finger tissue. The space or volume in which the user's fingers can be inserted under the rim 26 also allows easier removal of the magnetic hanger from its magnetic attraction to the metallic surface of the door 12. This feature is very advantageous especially when the magnets 20 and 22 are strong and the magnetic attraction is difficult to carefully control by the user. In other words, when a strong magnet is brought close to a metallic object, the magnet tends to quickly move into attachment and the control over the small distance by the user is lost. If the tissue of one's finger happens to be located between the magnet and the metallic surface, then the tissue can be easily pinched. The space between the rim 26 and the back surface of the connecting channel wall 28c overcomes the disadvantages with conventional magnetic hangers.

Another advantage flows from the utilization of the space between the rim 26 and the connecting channel wall 28c. The removal of the magnetic hanger 10 from a metallic surface 12 is facilitated, as a portion of one's finger can be pushed into the space or volume to provide a grip on the edge 27 of the magnetic hanger 10 and allow the user to pull the hanger 10 away from the metallic surface and disengage the magnetic attraction. Thus, the space between the rim 26 and the connecting channel wall 28c facilitates not only the installation of the magnetic hanger 10, but also the removal from the metallic surface 12.

The utilization of the channel 28 also provides rigidity to the frame 18 so that it does not flex or deform during removal of the magnetic hanger 10 from the metallic surface 12. Moreover, since the channel 28 encircles the periphery of the frame 18, as does the rim 26, the frame 18 remains rigid irrespective of the location of the frame 18 grasped by the user to remove the magnetic hanger 10 from the metallic surface 12. The same advantage is available when the magnetic hanger 10 is applied to the metallic surface 12. While the peripheral channel 28 provides rigidity to the frame 18, it also allows the use of a thinner gauge of metal, thus decreasing the cost of the magnetic hanger 10.

With reference to FIG. 2, a majority of the outer surface of the frame 18 is flat and oval-shaped. When the item suspended from the hook 30 is of a shape that allows the magnetic hanger 10 to be visible, the outer flat surface of the frame 18 (opposite side of the floor of the well 24) can be decorated or engraved. Decorations can include painted holiday depictions of, for example, Christmas bells, a Christmas tree, candy canes, or engraved with the name of the holiday, the owner's name and/or address, the word "Welcome" or "Noel," etc. This allows the magnetic hanger 10 to personalize the owner's residence to guests. Other decorative attachments can be employed with the magnetic hanger 10. For example, an engraved metal plate can be constructed so that it can be slid onto the frame 18 of the magnetic hanger 10 and remains there through the magnetic attraction to the magnets. Other attachment techniques are readily available to those skilled in the art.

Figure 10:
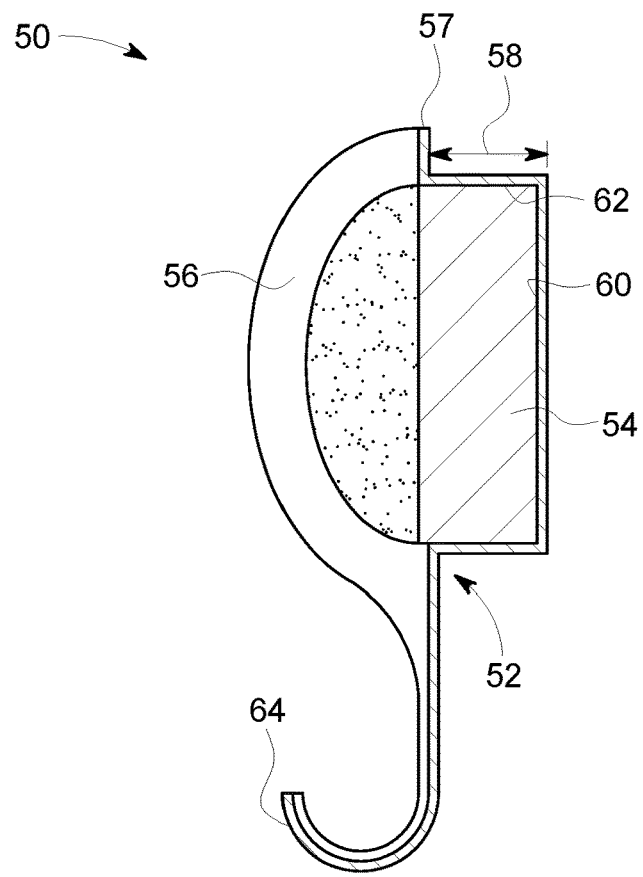
FIG. 10 is an isometric side view of a round magnetic hanger constructed according to another embodiment of the invention.

With reference now to FIG. 10, there is illustrated a magnetic hanger 50 constructed according to another embodiment of the invention. Here, the frame 52 is generally round instead of oval, and a single magnet 54 is employed. With this configuration, there is no channel, as described above in connection with the magnetic hanger of FIGS. 2-8. Rather, the frame 52 is constructed with the rim 56 spaced a distance 58 from the back surface of the central recessed well 60. The distance 58 can be 6.0 mm, or other suitable dimension. The frame 52 is stamped and otherwise formed so that the rim 56 extends from the outer edge 57 radially inwardly to the cylindrical vertical wall 62 of the central recessed well 60, which defines a sidewall of the well 60, and then extends downwardly to the floor of the recessed well 60. The recessed well 60 is thus well adapted for receiving therein the magnet 54. The magnet 54 is generally the same shape and thickness as the well 60. The hook 64 is formed with the sheet metal as an extension of the rim 56. The magnetic hanger 50 of this configuration includes many of the same advantages as the embodiment described above. In the embodiment of FIG. 10, the back surface of the magnet 54 of the magnetic hanger 50 is exposed. A thin layer of a cover material (not shown) can be adhered over the back of the magnetic hanger 50 to hide the magnet 54 and the back surface of the rim 56. The magnetic field of the magnet 54 can easily extend through the floor of the well 60 and to the magnetic surface 12 to which it is attached.

Figure 11:
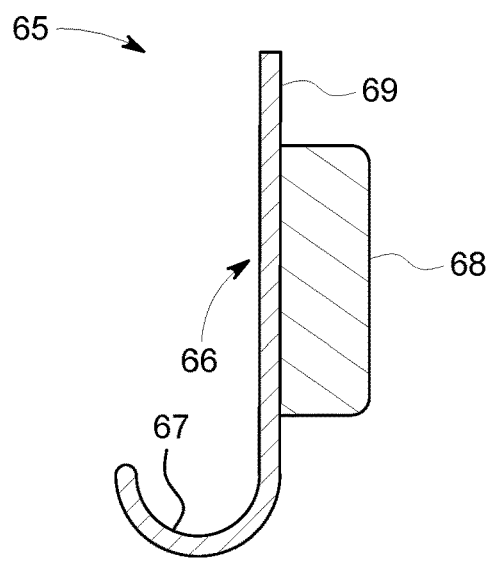
FIG. 11 is a cross-sectional view of yet another embodiment of the invention.

Yet another embodiment of the invention is illustrated in FIG. 11. According to this embodiment, the magnetic hanger 65 is of simplified form including a flat sheet metal piece that forms the flat frame to which the magnet 68 is bonded. The flat metal piece includes an elongate extension that is bent to form a hook 67. The diametric dimension of the frame 66 is larger than the corresponding diametric dimension of the magnet 68, thus forming an outwardly extending rim 69. Like the embodiments described above, the space between the rim 69 and the metallic surface 12 to which the magnetic hanger 65 is installed provides a sufficient volume for inserting the finger tips during installation or removal of the magnetic hanger 65.

Figure 12:
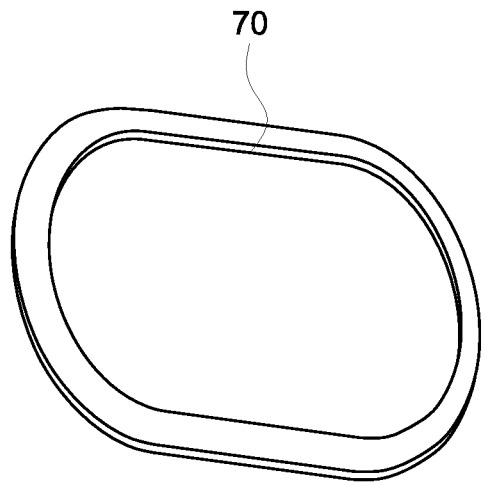
FIG. 12 is an isometric frontal view of a gasket that can be adhered to the back side of the rim of the magnetic hanger of FIG. 3.

FIG. 12 illustrates a gasket 70 that is shaped like the rim 26 of the magnetic hanger frame 18 of FIG. 3. The gasket 70 can be a thin layer of a thermoplastic polyurethane (TPU) material that is adhered to the backside of the rim 26. The TPU material is a mixture between a hard plastic and a soft silicone material that provides a very dense and smooth rubber. The gasket 70 provides a cushioning effect when the user places his/her finger tips or finger nails under the rim 26 when installing or removing the magnetic hanger 10 from the metallic surface 12. The outer edge of the gasket 70 can function to cover the back corner edge of the rim 26 so that the user's finger tips are not inadvertently cut or bruised by the corner of the metallic edge of the rim 26.

Figure 13:
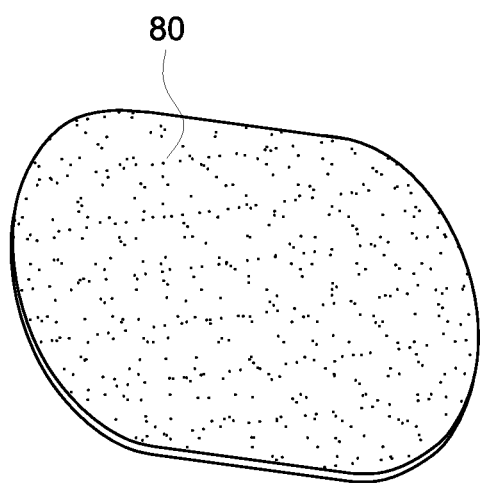
FIG. 13 is an isometric view of a pad or cover that can be adhered to the backside of the magnetic hanger of FIG. 3.

FIG. 13 illustrates a friction pad or cover pad 80 that can be adhered to the backside of the magnetic hanger 10 to provide a better grip to the metallic surface to which the hanger is magnetically attached. The pad 80 can be constructed with a rough back, such as like a fine sand paper, or other suitable friction material. Alternatively, the back cover 80 can simply be constructed of a suitable cover material to hide the magnets 20 and 22 and provide an aesthetically pleasing appearance. In practice, a layer of TPU material can be utilized as a friction pad and cushioning material 80. The pad 80 can be adhered to the two magnets 20 and 22 of the magnetic hanger 10. The pad 80 can be constructed with a different shape and fastened to the back surface of the metal frame 52 of the magnetic hanger 50.

The pad 80 fastened to the back of the magnetic hanger 10 provides a cushion so that a pair of magnetic hangers 10 can be used to hang items from a glass plate, such as a door or window. One magnetic hanger 10 can be placed on one side of the glass plate and the other magnetic hanger 10 can be placed on the opposite side of the glass plate so that the two magnetic hangers 10 are attracted to each other through the plate of glass. The pads 80 prevent the glass from being scratched, and the hooks 30 can be grasped to either gently apply the magnetic hangers 10 together, or to pry the magnetic hangers 10 apart.

Those skilled in the art may find it advantageous to construct the gasket 70 and the friction backing 80 as a single piece of material. As an alternative, the combined gasket 70 and backing 80 could be a coating that is sprayed on the back side of the magnetic hanger, or the magnetic hanger can be dipped into a liquid that cures into a state that provides a cover, a cushion or a friction surface.

In the embodiments described above, the steel frame is coated with clear or colored lacquer to provide an aesthetically pleasing and decorative finish to the magnetic hanger 10, as well as protect it from oxidation and weathering. Other finishes can be utilized to provide a rust and oxidation proof frame, including anodization, paint, etc.

While the preferred embodiment of the magnetic hanger 10 has an oval shape, such shape is not necessary to the practice of the invention. The frame 18 can be other shapes, including the round shape as illustrated in FIG. 10, as well as square, rectangular, diamond, etc. Moreover, while the various embodiments illustrate the well in which the magnet is fully engulfed, this is not necessary to the practice of the invention. Those skilled in the art may find it advantageous to form the well only deep enough to engulf half the thickness of the magnet, or engulf other thicknesses of the magnet. It should also be understood that the various features described herein can be utilized in any of the magnetic hanger embodiments.

While the preferred and other embodiments of the invention have been disclosed with reference to specific hanger components, and associated methods of fabrication thereof, it is to be understood that many changes in detail may be made as a matter of engineering choices without departing from the spirit and scope of the invention, as defined by the appended claims.

What is claimed is:

1. A magnetic hanger for attachment to a magnet attracting surface and for removal of said magnetic hanger from the magnetic attracting surface by a person's fingers, said magnetic hanger comprising:
   a frame member, said frame member having a hook for hanging an item thereon;
   at least one magnet attached to said frame member;
   said magnetic hanger having a back for magnetically engaging with the magnet attracting surface to which said magnetic hanger is removably attached; and
   said frame member having a rim located around at least a part of a periphery of said frame member, said frame member further including a top portion and opposite side portions of said frame member as viewed when said magnetic hanger is magnetically engaged to a vertical magnet attracting surface and with said hook located at a bottom of said frame member, said rim spaced from the magnet attracting surface when said magnetic hanger is magnetically engaged with the magnet attracting surface, said space between said rim and the magnet attracting surface being sufficient so that at least a portion of the person's finger tips can be inserted therein at the top portion of said magnetic hanger, and the person's respective fingers of both hands can be inserted therein at said opposite side portions of said magnetic hanger without pinching such finger tips when installing said magnetic hanger.

2. The magnetic hanger of claim 1, wherein said frame member includes an annular channel formed therein to provide reinforcement to said frame member, said annular channel having an inner sidewall and an outer sidewall, each said sidewall parallel to each other and extending in an annular manner.

3. The magnetic hanger of claim 2, wherein said annular channel includes a back surface that magnetically engages with the magnet attracting surface, and said space is measured between said rim and the back surface of said annular channel.

4. The magnetic hanger of claim 1, wherein said space is about 6.0 mm.

5. The magnetic hanger of claim 1, wherein said rim is attached to said frame member so as to be generally parallel to the magnet attracting surface, and said rim extends all around the periphery of said frame member, and a portion of said rim extends radially outwardly to form a portion of said hook.

6. The magnetic hanger of claim 5, further including a channel having an inner sidewall and an outer sidewall, said inner and outer sidewalls being parallel to each other, and said channel extending parallel to said rim, and the outer sidewall of said channel formed integral with said rim.

7. The magnetic hanger of claim 1, wherein said rim comprises one or more surfaces that are parallel to the magnet attracting surface to which the magnetic hanger is attached.

8. The magnetic hanger of claim 7, wherein said frame is constructed with sheet metal, and said hook and said rim are constructed of sheet metal.

9. The magnetic hanger of claim 8, wherein said frame is constructed of a single piece of sheet metal.

10. The magnetic hanger of claim 8, wherein said rim is formed with an elongate extension that is bent to form the hook of said magnetic hanger.

11. The magnetic hanger of claim 1, wherein said frame member is constructed from a single piece of sheet metal, said frame member constructed integral with said rim and with a well in which the at least one magnet is attached, and said frame member is constructed with a peripheral channel having an inner sidewall parallel to an outer sidewall, said peripheral channel located between said rim and said well, a floor of said well integral with the inner sidewall of said peripheral channel.

12. The magnetic hanger of claim 11, wherein the inner and outer sidewalls of said peripheral channel are connected with a flat connecting back wall, said flat connecting back wall of said peripheral channel is parallel to the magnet attracting surface to which said magnetic hanger is magnetically attracted.

13. The magnetic hanger of claim 12, wherein said frame member includes a circumferential edge which defines an outer edge of said rim, and said peripheral channel extends around said frame member and circumscribes an inner portion that defines said well.

14. The magnetic hanger of claim 1, wherein from a frontal view, said magnetic hanger is oval in shape, and includes two magnets.

15. The magnetic hanger of claim 14, wherein said magnetic hanger further includes two round magnets located side by side.

16. The magnetic hanger of claim 1, wherein said frame member is round in shape and includes a single round magnetic.

17. A magnetic hanger for suspending an item with respect to a magnet attracting surface, said magnetic hanger comprising:
a frame member having a rim located around a periphery thereof, said rim extending radially outwardly and generally parallel to the magnet attracting surface to which said magnetic hanger is magnetically attached;
said frame member having a channel that has first and second sidewalls that are spaced apart, said first and second sidewalls connected together with a connecting back part that is adjacent the magnet attracting surface;
the first sidewall of said channel is connected to said rim, and the second sidewall of said channel forms a well of said frame member, a floor of said well is also generally parallel to the magnet attracting surface, said channel extending backwardly toward the magnet attracting surface to thereby provide at least in part a space between said rim and the magnet attracting surface, and said space is sufficient to allow at least a portion of a person's fingers to move said magnetic hanger into magnetic attachment with the magnet attracting surface without a user's fingers being pinched;
at least one magnet attached to the floor of said well of said frame member; and
said rim of said frame member having an elongate extension which is bent toward a frontal portion of said magnetic hanger to form a hook to which the item can be suspended.

18. The magnetic hanger of claim 17, where the connecting back part of said channel is flat and is also parallel to the magnet attracting surface.

19. A magnetic hanger having a magnet for attachment to a magnet attracting surface and for removal of said magnetic hanger from the magnet attracting surface by a person's fingers, said magnetic hanger comprising:
a frame member constructed with a material;
said material is shaped so as to have a rim that is planar and spaced from the magnetic attracting surface sufficiently such that a person's finger tips can be inserted between said rim and the magnetic attracting surface;
said material is shaped so that said planar rim is integral with an outer sidewall of a channel where said outer sidewall is generally orthogonal to said planar rim and extends in a direction toward the magnetic attracting surface;
said material is shaped so that said outer sidewall of said channel is integral with a bottom of said channel which is parallel to the magnetic attracting surface and extends in a direction toward the center of said frame member;
said material is shaped so that said channel bottom is integral with and generally orthogonal to an inner sidewall of said frame member which extends away from the magnetic attracting surface;
said material is shaped so that said inner sidewall of said channel is integral with a planar wall to which the magnet is attached, where said magnet attaching wall is parallel to the magnet attracting surface and spaced therefrom; and
said material of said frame member extends through a right half of the lateral cross section and is formed from said material as a mirror image of said left half of said lateral cross section.

20. The magnetic hanger of claim 19, wherein said rim is annular shaped when said frame member is viewed from a front thereof, and the bottom and inner and outer sidewalls of said channel are annular shaped when said frame member is viewed from the front thereof, and a hook is formed as an extension of a bottom portion of said rim when said frame member is viewed from the front thereof.

* * * * *